United States Patent
Raghavan et al.

(10) Patent No.: US 10,282,200 B2
(45) Date of Patent: May 7, 2019

(54) OUT-OF-DEPLOYMENT-SCOPE MODIFICATION OF INFORMATION-TECHNOLOGY APPLICATION USING LIFECYCLE BLUEPRINT

(71) Applicant: VMware, Inc., Palo Alto, CA (US)

(72) Inventors: Vijay Raghavan, Mountain View, CA (US); Yahya Cahyadi, San Jose, CA (US); Julie Ann Pickhardt, Boulder, CO (US); Kevin Xie, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/840,711

(22) Filed: Dec. 13, 2017

(65) Prior Publication Data

US 2018/0165090 A1     Jun. 14, 2018

Related U.S. Application Data

(60) Provisional application No. 62/433,816, filed on Dec. 14, 2016.

(51) Int. Cl.
| | |
|---|---|
| *G06F 8/65* | (2018.01) |
| *G06F 8/71* | (2018.01) |
| *G06F 9/46* | (2006.01) |
| *G06F 8/60* | (2018.01) |
| *G06F 9/50* | (2006.01) |

(52) U.S. Cl.
CPC ............... *G06F 8/71* (2013.01); *G06F 8/60* (2013.01); *G06F 9/46* (2013.01); *G06F 9/5077* (2013.01)

(58) Field of Classification Search
None
See application file for complete search history.

(56) References Cited

U.S. PATENT DOCUMENTS

| | | | |
|---|---|---|---|
| 9,047,133 B2 | 6/2015 | Winterfeldt et al. | |
| 9,052,961 B2 | 6/2015 | Mangtani et al. | |
| 9,170,798 B2* | 10/2015 | Nagaraja | G06F 8/61 |
| 9,535,669 B2 | 1/2017 | Eksten et al. | |
| 2011/0321033 A1* | 12/2011 | Kelkar | G06F 9/44505 |
| | | | 717/174 |
| 2015/0280981 A1* | 10/2015 | Sasada | H04L 41/0853 |
| | | | 709/222 |
| 2015/0304175 A1* | 10/2015 | Maes | G06F 8/70 |
| | | | 709/226 |
| 2018/0165071 A1* | 6/2018 | Raghavan | G06F 8/60 |
| 2018/0165158 A1* | 6/2018 | Raghavan | G06F 11/14 |

* cited by examiner

*Primary Examiner* — Philip Wang
(74) *Attorney, Agent, or Firm* — Clifton Leon Anderson

(57) ABSTRACT

An information-technology (IT) blueprint is an executable document that, when executed, can be used to create an IT application such as an e-commerce site. An IT lifecycle blueprint can further be used to manage (e.g., modify) and, ultimately, destroy such an IT application. To this end, an IT lifecycle blueprint can include idempotent methods that achieve the same result whether starting from a blank (real or virtual) infrastructure or from a previously populated infrastructure. To effect a modification that is not within the scope of the blueprint that created the IT application, a new lifecycle blueprint can be created, if necessary, and executed to effect the modification. In a sense, the new lifecycle blueprint replaces the old lifecycle blueprint as a manager tool for the IT application.

11 Claims, 11 Drawing Sheets

OUT-OF-DEPLOYMENT-SCOPE MODIFICATION OF INFORMATION-TECHNOLOGY APPLICATION USING LIFECYCLE BLUEPRINT

BACKGROUND

Virtualization has enabled enterprises to implement computer systems that meet their needs without having to concern themselves with underlying hardware. Tools are available that allow an enterprise to design a system that meets its needs and to automatically implement the design. Templates of predesigned systems can simplify the design process. For instance, an enterprise desiring an e-commerce site can select from a variety of templates suitable for e-commerce sites. Once the template-based design is selected, and, in some cases, customized for the enterprise, it can be implemented. Upon implementation, the resulting system is available for use and management by the enterprise.

DETAILED DESCRIPTION

Figure 1:
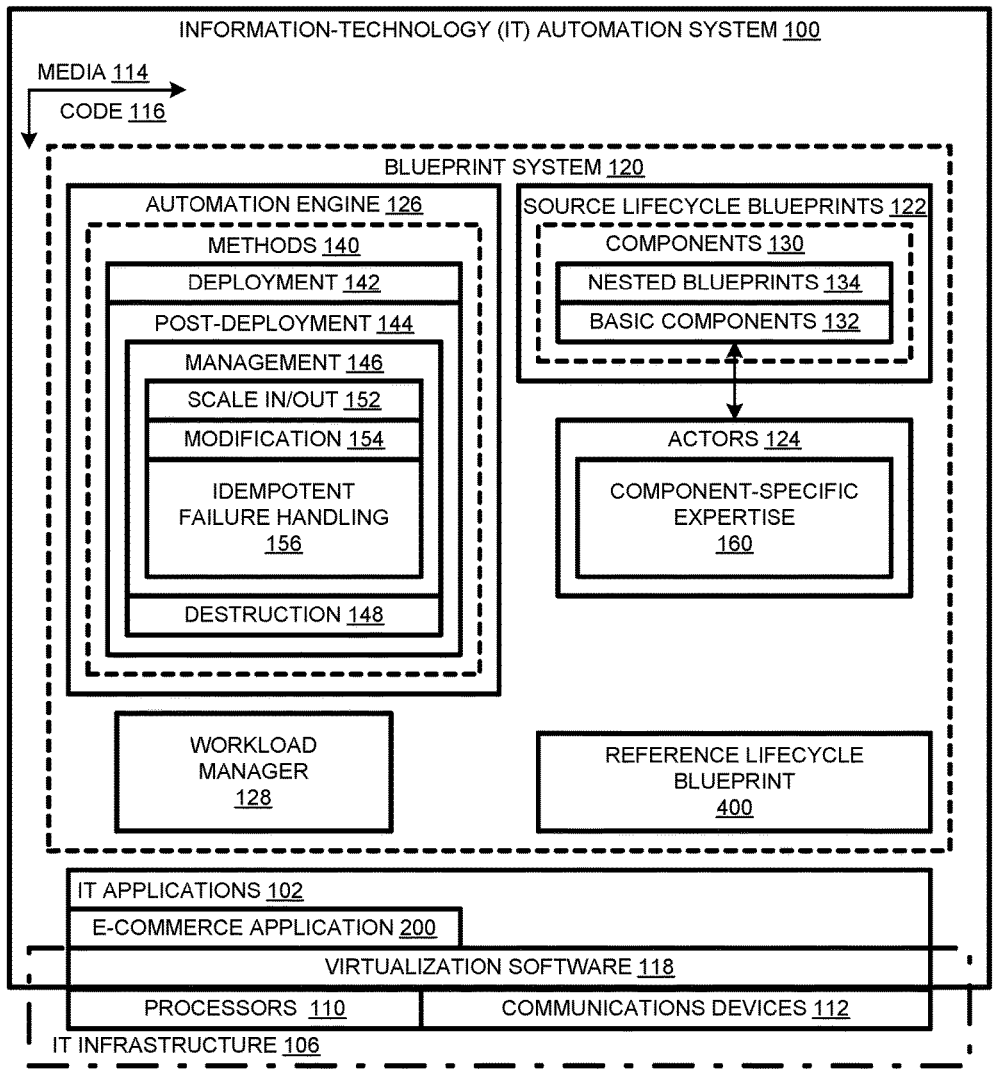
FIG. 1 is a schematic diagram of an information-technology (IT) automation system.

The present invention relates to modifications of an IT application that are outside the "scope of deployment" of a lifecycle blueprint. When a modification of an IT application is desired that cannot be achieved using the reference lifecycle blueprint currently dedicated to the IT application, a new lifecycle blueprint is selected or created for which the target configuration of the IT application is within the scope of deployment.

A conventional "automation engine" for implementing a design to yield a working IT application contains the expertise to do so. Applications requiring expertise not included in such an implementation engine cannot be implemented. To protect the user experience, design tools may be limited to designing implementable applications. Increasing design flexibility by adding expertise to a complex automation engine consumes considerable highly skilled and costly effort. Information-technology "blueprints" vastly reduce the effort required to add expertise to an IT system.

Herein, an "information-technology blueprint" or, more simply, a "blueprint", is an executable document that can be executed to implement an IT application, such as an e-commerce site, a social-media site, a news site, a crowd-sourced information site, etc. A blueprint's purpose is to dictate the component composition & configuration constraints (from which we can derive a new state) of a deployment. Expertise is added to a blueprint-based IT automation system by adding blueprints that contain the expertise required to deploy them. The automation engine that executes them does not, in general, need to be updated. Since the skill and effort required to author a blueprint are far less than the skill and effort required to update a complex automation engine, more people with a greater variety of expertise can contribute to the flexibility of a blueprint-based IT automation system.

Herein, a "lifecycle" blueprint is a blueprint that contains the expertise required to cover, not only deployment, but the entire lifecycle (birth, life, and death) of an IT application. That is, the blueprint provides for, not only to deploying an application, but also managing and, eventually, destroying, the application. Managing includes, for example, scaling an application out or in, updating components, and other modifications to the application. Thus, a lifecycle blueprint may maintain an association with, i.e., be dedicated to, an IT application throughout the latter's entire lifecycle.

Blueprints can offer selections among ranges of blueprint attribute values that result in respectively different configurations for an IT created through deployment of the blueprint or modified through non-deployment execution of the blueprint.

A source blueprint contains composition of components and constraints for each component's properties. Defaults may be specified in the blueprint, and properties may be optional. However, if a required property has no default, then the values need to be specified at request time, as request data/via user input. The full set of possible configurations that can be selected is referred to herein as the "scope of deployment" for the blueprint. A lifecycle blueprint may be able to deploy configurations within the blueprint's scope of deployment and may be able to modify an IT application to yield a new configuration within the scope of deployment.

However, modifications outside the scope of deployment can be problematic. For example, if a blueprint allows a selection from 1-8 virtual machines, a modification from 4 virtual machines to 6 virtual machines would be within the scope of deployment. However, a modification from 6 virtual machines to 10 virtual machines would yield a result outside the scope of deployment.

One approach to modifications outside the scope of the deployment is to not rely on the blueprint for such modifications. However, if modifications are made without using the blueprint, the blueprint may no longer be able to reflect the current state of the IT application and may be of no further use in managing the IT application. Accordingly, the present invention provides for: 1) creating a new lifecycle blueprint that includes the desired configuration within its scope of deployment; and then 2) using that new lifecycle blueprint to effect the desired modification. In this way, management and eventual destruction can be continued within the framework of lifecycle blueprints. The discussion below of FIGS. 1-8 discusses lifecycle blueprints including within-scope modifications. The ensuing discussion with reference to FIGS. 9-12 addresses the innovations concerning using a new lifecycle blueprint to manage an IT application created using another lifecycle blueprint.

As shown in FIG. 1, an information-technology system 100 provides for lifecycle (creation through destruction) management of IT applications 102. Applications 102 run on an IT infrastructure 106 including hardware, e.g., processors 110, communications devices 112 (including input-output devices) and media 114 (e.g., memory, disks). Non-transitory media 114 is encoded with code 116 representing the software described herein including virtualization software 118 of IT infrastructure 106 and including blueprint system 120.

Blueprint system 120 includes source lifecycle blueprints 122, actors 124, an automation engine 126, and a workload manager 128. Source lifecycle blueprints 122 contain components 130 that serve as building blocks. Two types of blueprint components may be distinguished: basic blueprints 132 and nested blueprints 134. A blueprint may incorporate another ("nested") blueprint as a component. Components that are not blueprints themselves are "basic" components. The expertise required by a basic component can be included in the basic component itself and/or in respective external "actors".

Blueprints 122 include expertise, e.g., embodied in "idempotent" methods 140 for both deployment 142 and post-deployment 144, the latter including management 146 (of the deployment instance) and destruction 148. Idempotent methods are methods that reach the same endpoint from different starting points. Typically, an idempotent method compares a requested configuration (e.g., of a target infrastructure or application) with the current configuration, and then generates and executes a workflow to modify the current configuration to reach the requested configuration.

Examples of management expertise include methods for scaling 152 an application out or in, other modifications 154, such as software changes, and failure handling procedures 156. Note that execution of a blueprint typically involves executing its idempotent methods including any idempotent methods of blueprint components nested within. The actors for basic components can also include idempotent methods. Automation engine 126 parses and executes blueprints 122 to effect, upon request, deployment, management, and destruction. The requests can be made by a (human) user or an automated entity such as workload manager 128. Automation engine 126 can include conversion code for transferring control of an application from one blueprint to another blueprint, e.g., to effect out-of-deployment-scope modifications to the application. For example, an out-of-deployment scope modification can involve adding new security software or logging agents to a production application that was deployed using a blueprint that did not provide for such software.

In the illustrated embodiment, a new blueprint does not contain any conversion code. Rather, it only contains new composition & configuration constraints of components for the application. The blueprints are not aware of how deployment states are achieved, only what the deployment states should look like. So, the new lifecycle blueprint will contain material changes to configuration constraints of pre-existing components, or addition or removal of components, or likely both. The logic to understand how to mutate an application from one scope of deployment to another is contained in the automation engine.

Figures 3, 4:
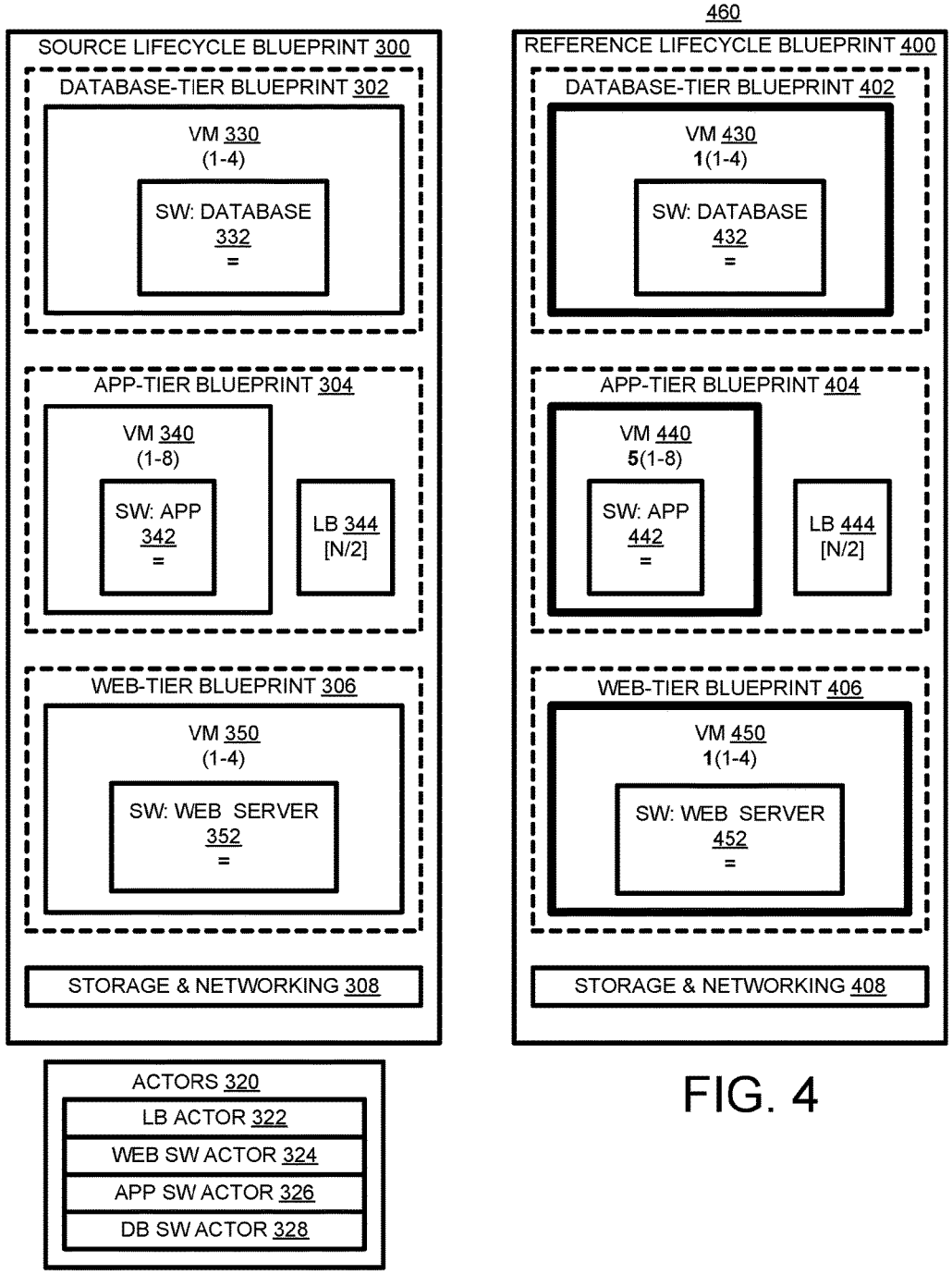
FIG. 3 is a source lifecycle blueprint used to deploy the IT application of FIG. 2.
FIG. 4 is a reference lifecycle blueprint used for post-deployment management of the IT application of FIG. 2.

During deployment, a "snapshot" or replica of the original blueprint is made, yielding a "reference" lifecycle blueprint 400, detailed in FIG. 4. The reference blueprint 400 is associated with, i.e., dedicated to, the IT application that results from deployment. Either of the original blueprint and the reference blueprint can be modified without modifying the other. The reference blueprint maybe altered to specify selections where the original blueprint provides a choice. For example, if a source blueprint allows a selection from a range of 1-10 virtual machines, the reference blueprint can add that the user selected five virtual machines without affecting the original blueprint. From one perspective, a reference blueprint can be a customized source blueprint.

The selections made to effect deployment of an IT application may be modified post-deployment. Because the blueprint methods are idempotent, the method used to modify an application can be the same as the method used to deploy the application. Thus, the reference blueprint can be executed to modify the associated IT application. For example, the original selection of five virtual machines can be updated to six virtual machines. When a scale-out request is made to automation engine 126, the associated IT application is modified to include six virtual machines where there were only five before. This scenario is spelled out below.

Figure 2:
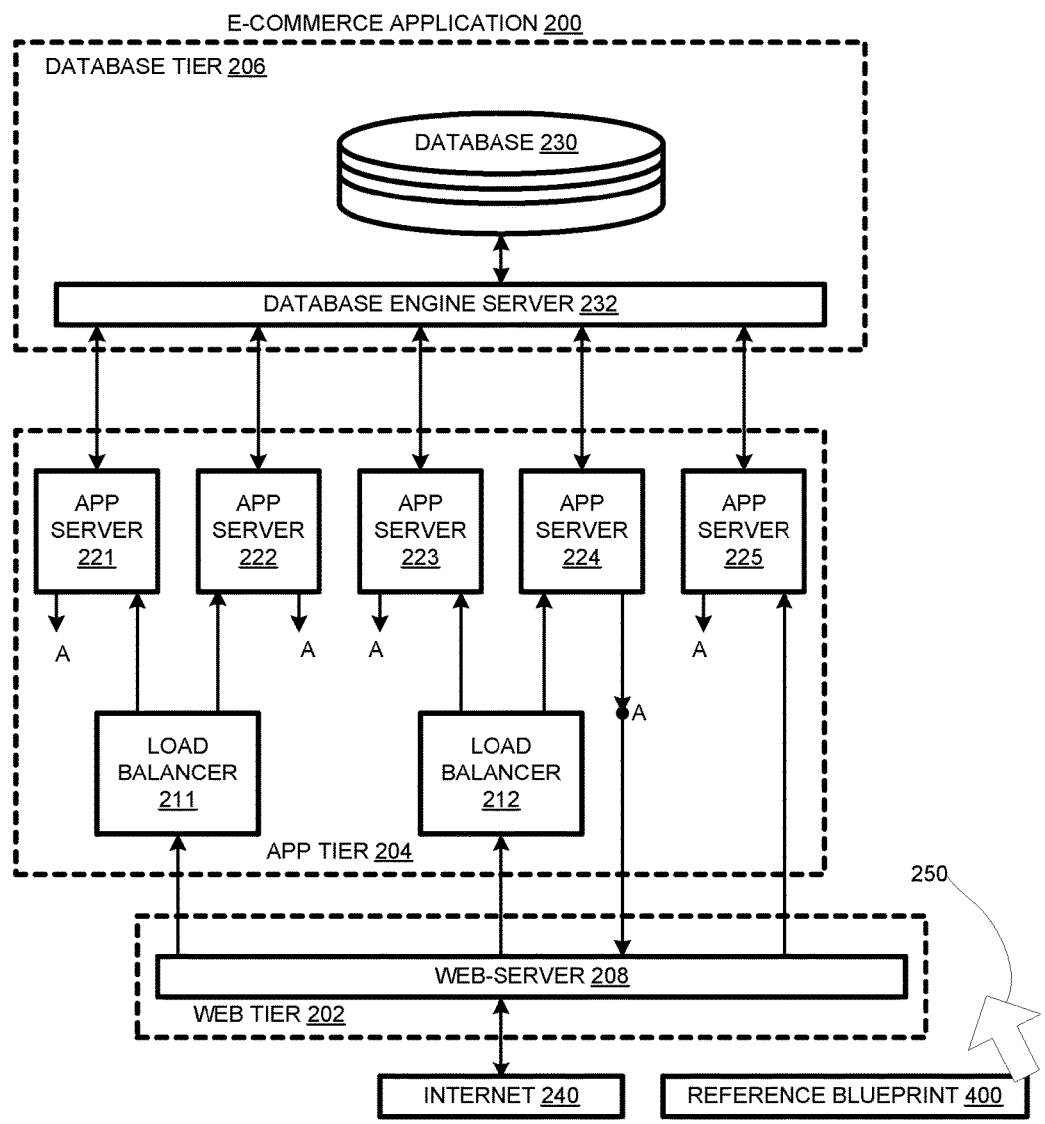
FIG. 2 is a schematic diagram of an e-commerce IT application executed on the IT automation system of FIG. 1.

A three-tier e-commerce IT application 200 is shown in FIG. 2 including a web tier 202, an app tier 204, and a database tier 206. Web tier 202 includes a single web server 208, that is, a single virtual machine running web server software. One function of web-server 208 is to receive requests over the Internet and forward them to a single app server or distribute them among plural app servers, that is, virtual machines that execute e-commerce apps.

In the case app tier 204 includes plural functionally identical app servers, web server 208 could, in principle, distribute the transactions evenly among the plural app servers. However, transactions can vary considerably in complexity such that a first app server may handle a single complex transaction in the time a second server handles many simple transactions. If the first server receives a series of complex transactions, it may become a bottleneck and appear slower than desired to a client/user. A load balancer can detect when an app server is backing up and preferentially forward requests to another app server until the backup is cleared.

Figure 5:
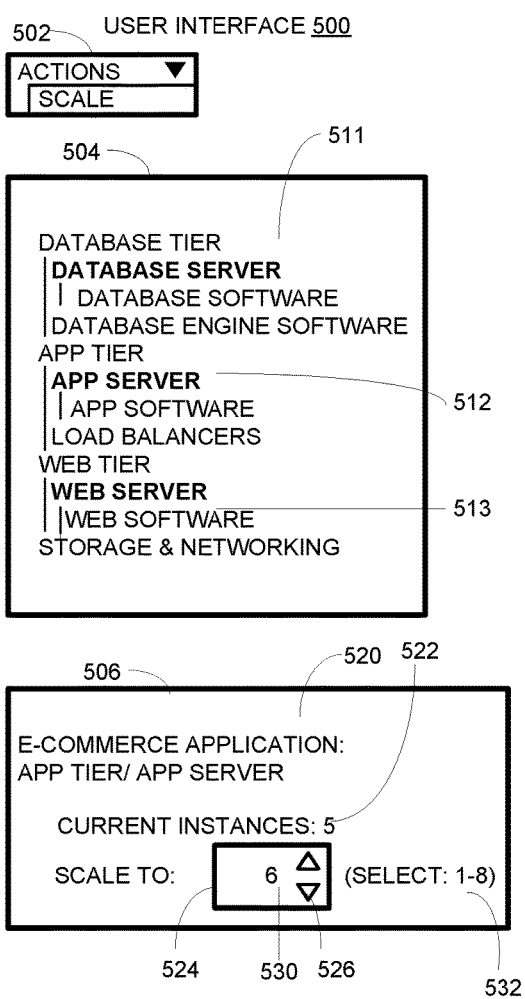
FIG. 5 is a directory-tree topological user interface for modifying the reference blueprint of FIG. 4.
Figure 6:
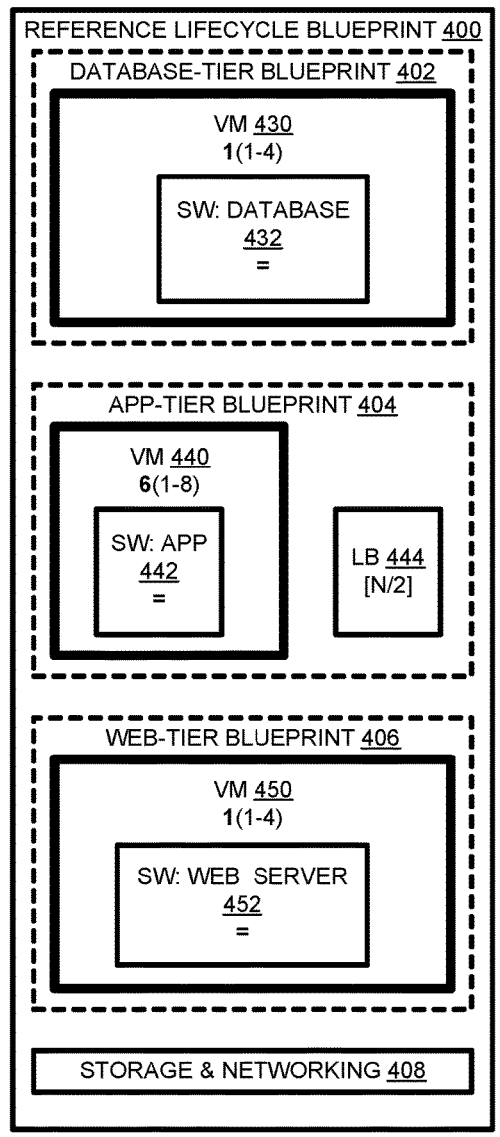
FIG. 6 is the reference lifecycle blueprint of FIG. 4 after modification using the user interface of FIG. 5.

If a five-way load balancer were available, it might be used in app tier 204 given the five app servers as in FIG. 5. However, in the illustrated embodiment, only two-way load balancers are available. Two load balancers 211 and 212 are used to service two app servers 221 and 222, and 223 and 224 each. The remaining app server 225 is fed directly by web server 208.

Some, but not necessarily all, transactions may require a query to a database 230 via a database engine running on a database engine server 232 of database tier 206. Accordingly, each app server 221-225 is arranged to communicate with database engine server 232. The database engine formulates queries into a form understood by database 230. The responses may be reformatted for consumption by an app server, and forwarded to the app server that presented the respective query. Responses are processed and packaged by the respective app server and forwarded to the client/user via web server 208 (via node A, as represented in FIG. 2) and the Internet 240.

As shown in FIG. 2, reference blueprint 400 is dedicated to (e.g., as indicated by arrow 250) e-commerce application 200. Reference blueprint 400 has been provisioned to realize e-commerce application 200. Post deployment, reference blueprint 400 is used to modify, e.g., scale out, e-commerce application 200.

To this end, a value, e.g., a number of app servers, previously applied to e-commerce application 200 is changed in reference blueprint 400, and then reference blueprint 400 is executed to implement the corresponding change in e-commerce application 200. In this way, reference blueprint 400 remains "coherent" or in "synchronization" with e-commerce application 200 and can be used, e.g., by automation engine 126, (FIG. 1) as a description of the current configuration of e-commerce application 200.

As shown in FIG. 3, a source lifecycle blueprint 300 used to deploy e-commerce application 200 (FIG. 2), includes a database-tier blueprint 302, an app-tier blueprint 304, a web-tier blueprint 306, and storage and networking components 308. Associated with source lifecycle blueprint 300 are actors 320, which include expertise, e.g., embodied in methods, required for deploying basic components of source lifecycle blueprint 300. The actors include a load-balancer actor 322, a web-software actor 324 (e.g., with installation instructions), an app-software actor 326, and a database-software actor 328.

Database-tier blueprint 302 includes a virtual-machine blueprint 330 and a database-software basic component 332. Database-tier blueprint 302 specifies a range of 1-4 virtual machines to be used as database servers, with the exact number to be selected, e.g., as part of a deployment request. Database-tier blueprint 302 further specifies, with respect to database-software component 332, that the number of software installations is equal to the (to-be determined) selected number of database servers.

App-tier blueprint 304 includes a virtual-machine blueprint 340, an app software basic component 342, and load balancer basic component 344. App-tier blueprint 304 allows a selection from a range of 1-8 virtual machines. App-tier blueprint 304 specifies that the number of instances of app-server software is to be equal (=) to the number of virtual-machine blueprint instances in blueprint 304. App-tier blueprint 304 specifies that the number of load balancers is to be equal to some function, e.g., [N/2], i.e., the characteristic (non-fractional) part of N/2, where N is the number of virtual machines in blueprint 304.

Web-tier blueprint 306 includes a virtual machine blueprint 350 and a web server software basic component 352. Web-tier blueprint 306 specifies a range of 1-4 virtual machines, from which a value can be selected for deployment. Web-tier blueprint 306 further specifies that the number of web-software installations is to be equal to the number of virtual machines deployed.

Reference lifecycle blueprint 400, shown in FIG. 4, is created by taking a snapshot of source lifecycle blueprint 300 or a substitute blueprint. Therefore, at least initially, reference lifecycle blueprint 400 has instances of the same components in the same arrangement as source lifecycle blueprint 300. In some embodiments, management policies may cause the reference blueprint to diverge from the source blueprint. At the very least, choices required for deployment are made in the reference blueprint prior to provisioning. For example, in FIG. 4, numbers of virtual machines have been selected for respective tiers.

Reference lifecycle blueprint 400 includes: a database-tier blueprint component 402, with a virtual-machine blueprint component 430 and a database-software basic component 432; an app-tier blueprint component 404 with a virtual-machine blueprint component 440, an app-server software basic component 442, and a load-balancer basic component 444; and a web-tier blueprint component with a virtual-machine blueprint component 450 and a web-server software component 452. In addition, reference lifecycle blueprint 400 includes storage and network components 408.

As illustrated, reference lifecycle blueprint 400 indicates that "1" is the number of virtual-machine instances selected from the original range of 1-4 virtual machines specified for the database tier; "5" is the number of virtual-machine instances selected for the app tier, and "1" is the number of virtual-machine instances selected for the web tier. Respectively equal numbers of software installations are to be selected for the tiers. The number of load balancers for the app tier is calculated to be [5/2]=2.

As indicated above, reference lifecycle blueprint 400 may be a snapshot of a "substitute" source lifecycle blueprint. For example, upon a deployment request, the deployment engine may look for an updated version of the requested blueprint and, if found, substitute it for the original blueprint. In such a case, the snapshot is taken of the updated version. Selected values are then indicated by the reference blueprint 400 as shown in FIG. 4.

From another perspective, FIG. 4 can serve as a user interface element 460. In FIG. 4 the components are arranged as a nested topological representation of a blueprint. The components (430, 440, and 450) that specify a range are highlighted (by a thick boundary to indicate they may be selected, e.g., for scaling out or in. Other blueprint components are relatively dim to indicate that they cannot be selected for scaling or for whatever the selected action is. By "topological" is meant that the graphical relationships among representations (of blueprint components) correspond to the relations among the blueprint components represented.

Alternatively, a directory-tree topological user interface 500, shown in FIG. 5, can include a drop-down menu 502 for selecting a modification action to be performed on an application, a directory tree representation 504 of the reference blueprint for the application, and a dialogue box 506. An action such as scaling, updating a (software) component, or adding a component can be selected. The components 511-513 to which the action may be applied are highlighted (e.g., bolded) in the directory tree. Selecting (e.g., clicking on) a highlighted component representation in the tree calls a dialogue box, e.g., dialog box 506. The un-highlighted items cannot be selected or activated to yield a dialog box.

Dialogue box 506 identifies the directory path name 520 for the selected component. The quantity 522 of current instances, in this case "5", is indicated. A numeric selection box 524 has up and down arrows 526 that can be used to increase or decrease the number of current instances. In the illustrated scenario, the up arrow has been clicked so that the "scale to" value 530 now equals "6". Entering the change modifies reference lifecycle blueprint 400, with the result indicated in FIG. 6, in which the number of current instances is "6" rather than "5".

Figure 7:
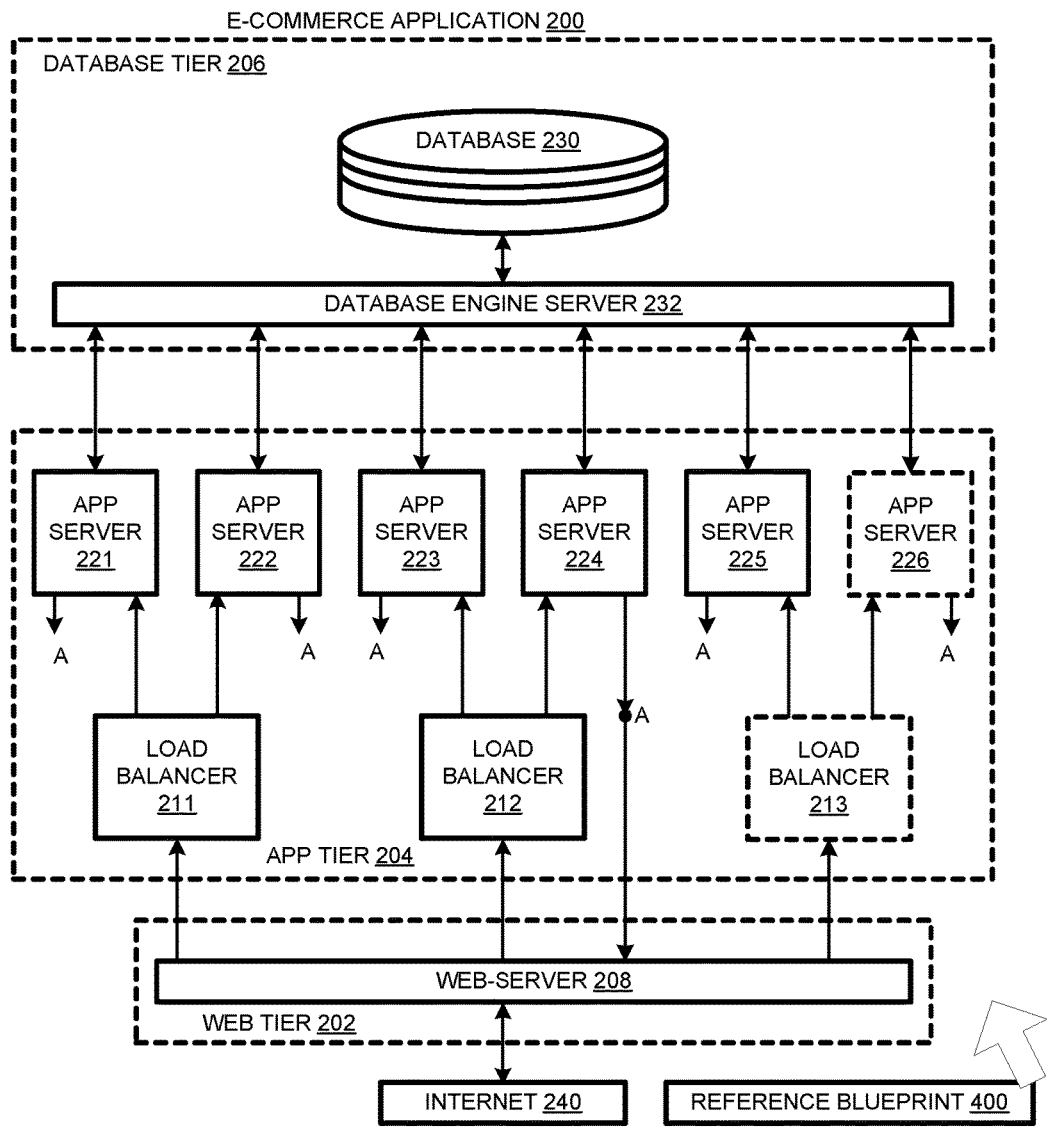
FIG. 7 is the IT application of FIG. 2 after modification resulting from deployment of the reference lifecycle blueprint of FIG. 6.

When the scale-out request is executed, a sixth app server 226 is created in app tier 204 and added to e-commerce application 200, as shown in FIG. 7. Since there are then six app servers, the formula [N/2] for load balancers requires three load balancers instead of two. Therefore, a third load balancer 213 is created and added to app tier 204. App server software is then installed on the added virtual machine. Internet protocol (IP) addresses are then assigned to the new server and the new load balancer. The new load balancer is informed of the IP addresses of the app servers it services, and web server 208 is informed of the IP address for the third load balancer 213.

Figure 8A:
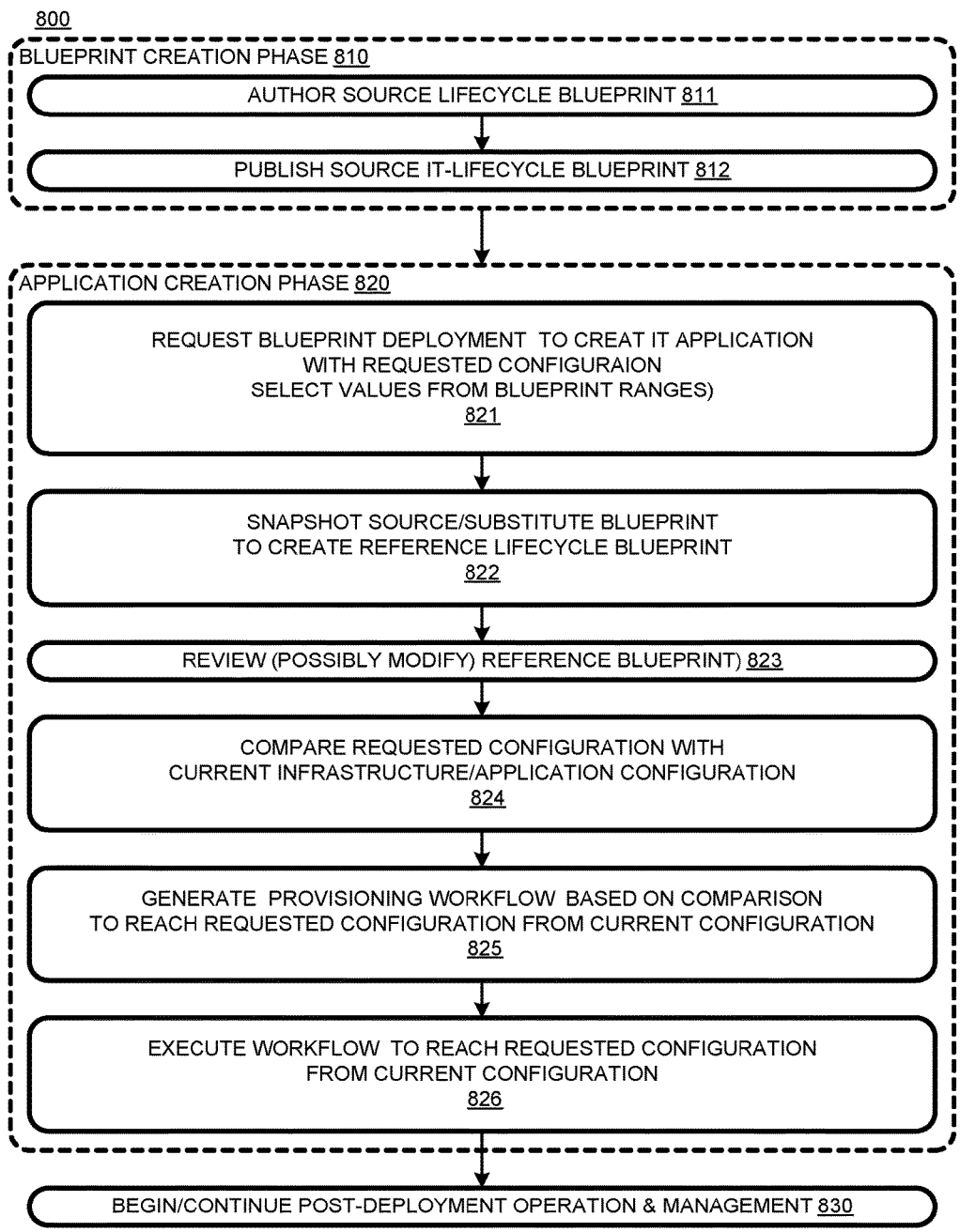
FIGS. 8A and 8B constitute a flow chart of an IT application lifecycle process applicable to the IT applications of FIG. 1 and other IT applications.
Figure 8B:
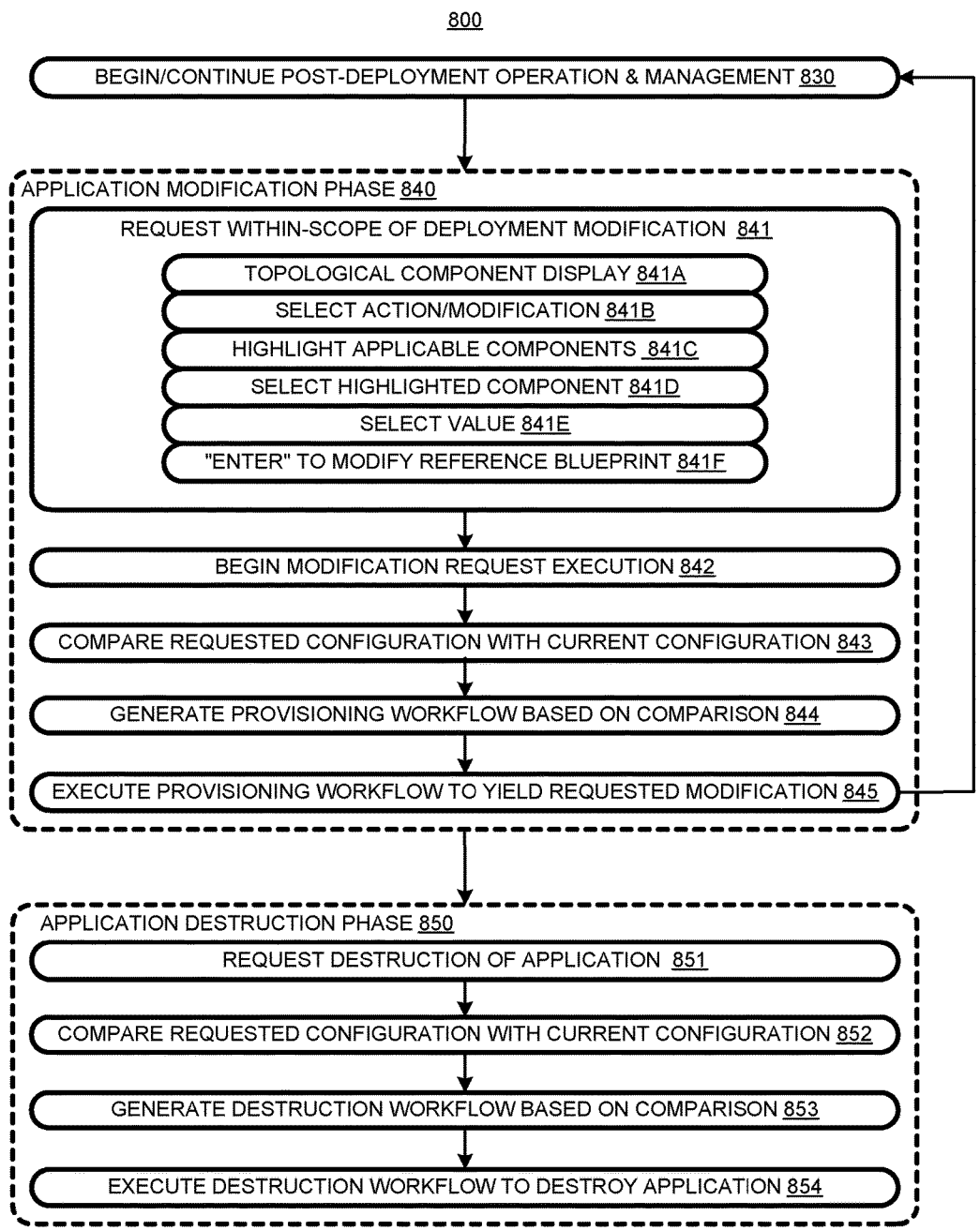

A lifecycle blueprint process 800, flow charted in FIGS. 8A and 8B, can be implemented in IT automation system 100 (FIG. 1) and other systems. A blueprint creation phase 810 begins, at 811, with authoring a source IT-lifecycle blueprint that includes expertise, e.g., in the form of idempotent methods, for creating, managing, and destroying an IT application. The blueprint also includes components, e.g., basic components and blueprint components. Components may have further expertise embodied in actors that are external to the blueprint. At 812, the source IT-application blueprint is published. This means it is available for deployment in a production setting.

An application creation phase 820 begins, at 821, with a request to deploy a blueprint to create an IT application with a requested configuration. To that end, the request may specify values selected from ranges allowed by the blueprint. Alternatively, some or all of those values can be specified during deployment. The request can be made by a human user or by an automated entity, e.g., in accordance with some management policy.

At 822, a reference lifecycle blueprint is created. In most cases, the reference blueprint is created by taking a snapshot of the source blueprint so that the reference blueprint is a replica of the source blueprint. However, in some cases, a blueprint is substituted for the source blueprint and the snapshot is taken of the substitute. The substitute can be derived by copying and modifying the source blueprint. For example, the deployment process may check to see if there are any updates available for the requested blueprint. If there is an update, the updated version may be the substitute and serve as the subject of the snapshot used to create the reference blueprint. In any case, the source and reference blueprints may be modified independently of each other, so they can diverge from each other. At 823, the reference lifecycle blueprint is reviewed for compliance with management and other policies. This review can include automated and human-participation approval procedures, and may result in a rejection of the deployment request, approval without modification, or approval with modification.

At 824, the blueprint method compares the requested configuration with the current infrastructure/application configuration. For example, the target virtual infrastructure may not be hosting any IT components, or there may be some remnants from a previous failure to create an IT application at the infrastructure. At 825, a provisioning workflow is generated based on the comparison and designed to reach the requested application configuration from the current configuration. At 826, the provisioning workflow is executed to establish the application in the requested configuration. This completes application creation phase 820. At 830, post-deployment operation and management are begun and continued.

Once an application is in operation, it may be modified in an application modification phase 840, shown in FIG. 8B. At 841, a request is made and received for a within-scope-of-deployment blueprint modification. Blueprints that offer a selection of values for one or more parameters can be said to offer a range of application deployment configurations based on the values selected, e.g., in the request. Once the application is deployed, there may be a reason to change some of the value selections. In the example presented in FIGS. 4-7, a range is 1-8 and the modification was from 5 to 6 (app servers). The reference blueprint could have deployed 6 servers original if that value had been selected in the originally deployment request. So the modification from 5 to 6 is within the deployable scope of the reference blueprint. On the other hand, selecting a modification from 5 to 9 would not be within the allowed blueprint range of 1-8.

Action 841 can be implemented as indicated in FIG. 8B. At 841A, a blueprint is displayed topologically, e.g., as in either FIG. 4 or FIG. 5. At 841B, the desired action or modification is selected. For example, a scale-in or scale-out action may be selected. At 841C, the components to which the action/modification is applicable are highlighted relative to components to which the action/modification is not applicable. For example, thicker lines, bolding, colors, etc., can be used to highlight in a representation of the reference blueprint, which may also be a representation of the application's current state. If a new action is selected, thereby repeating action 841B, then action 841C is repeated so that the components that the new action can apply to are highlighted and those to which the new action does not apply are not or no longer highlighted.

At 841D, one of the highlighted components is selected. In this case, the current value of a parameter relating to the selected action/modification is presented. At 841E, the new value is selected, e.g., by manipulating value controls or by overwriting the old value. At 841F, the new value may be "entered" so that the reference blueprint is modified to include the new value. This process is explained above with reference to FIG. 5.

At 842, execution of the modification request is begun. At 843, the requested configuration is compared with the current configuration. At 844, based on the comparison, a workflow is generated designed to convert the current configuration to the requested configuration. At 845, the workflow is executed so that the application matches the configuration expressed by the modified reference lifecycle blueprint. The application modification phase is thus complete. However, process 800 provides for looping back to post-deployment operation 830, allowing for further modifications by iterating application modification phase 840.

At some point, the application may no longer be required. Thus, an application destruction phase 850 begins, at 851, with a request to destroy the application. At 852, the desired application-free infrastructure configuration is compared to the current application configuration. At 853, based on the comparison, a destruction workflow is generated. This workflow can involve removing components based on an order specified in the blueprint. At 854, the destruction workflow is executed to destroy the application. This completes destruction phase 850 and lifecycle process 800.

In process 800 of FIGS. 8A and 8B, idempotency is apparent in the workflows that are generated based on a comparison of requested and current configurations, as at actions 825, 844, and 852. These workflows are generated in accordance with the methods of the dedicated reference lifecycle blueprint and based on the current configuration of the application (if any) and the target infrastructure. The methods determine what tasks are to be included in a workflow and the order in which the tasks are to be executed.

The IT application modifications discussed above are "within the scope of deployment" of the reference blueprint, that is, both the start state and the end state of the modification could have been reached initially by deploying the reference blueprint with suitable parameter values. However, "outside the scope" modifications may also be desired.

For example, it may be desirable to scale application 200 out to ten app servers, although reference blueprint 400 allows a maximum of only eight app servers. It may be desirable to add a component or substitute a component for an existing component. For example, a new 3-way load balancer may have been added to the component library after the source blueprint was published. A three-way load balancer can balance loads more effectively, and reduce the amount of component destruction and creation when dynamically changing the number of app servers. Finally, it may be desired to switch software, e.g., switch from an Oracle database to a SQL database.

One way to perform an out-of-scope modification of an IT application is to do so without using the reference blueprint. The disadvantage of this non-blueprint approach is that the automation features provided by the blueprint can be lost. For example, the ability of a blueprint to handle policy checking, and to automate dependency (property binding and provisioning order requirements) handling may be lost.

Accordingly, the present invention provides for using a "new" lifecycle blueprint for which the modification result is "within scope". "New" in this context means a blueprint not previously used in connection with the target IT application. Two cases may be distinguished: 1) the modification start point is within the scope of deployment of the new lifecycle blueprint; and 2) the modification start point is outside the scope of the new blueprint. If the modification start point is in the scope of the new blueprint, no special problems arise. However, there are some considerations that may arise if the start point is not in the scope of deployment for the new application, as explained with respect to the following example.

Figure 9:
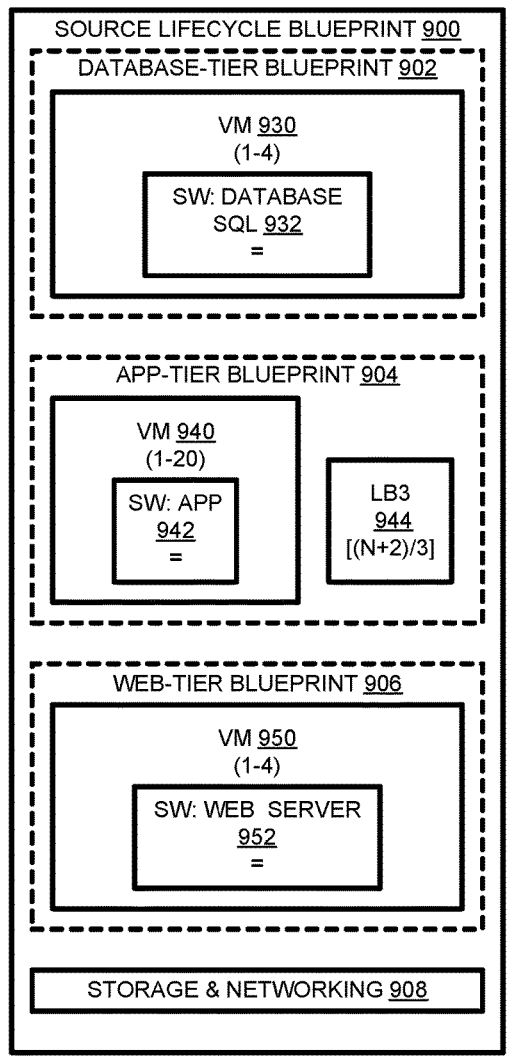
FIG. 9 is a schematic illustration of a source lifecycle blueprint to be used to effect an out-of-deployment-scope modification of an IT application created by another lifecycle blueprint.
Figure 10:
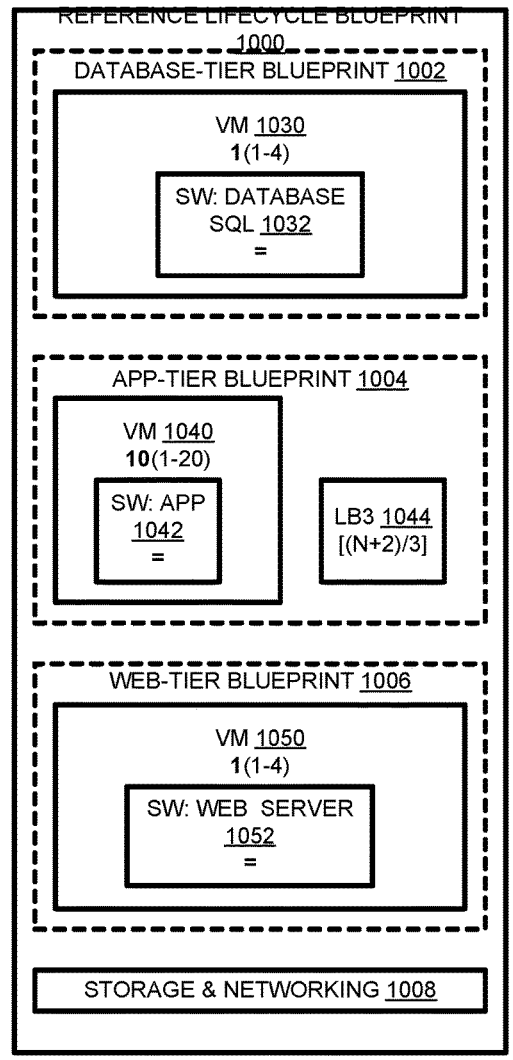
FIG. 10 is a reference lifecycle blueprint derived from the source lifecycle blueprint of FIG. 9.

As with source lifecycle blueprint 300 of FIG. 3, source lifecycle blueprint 900 of FIG. 9 includes a database-tier blueprint 902, an app-tier blueprint 904, and a web-tier blueprint 406. In addition, source lifecycle blueprint 900 includes storage & networking 908.

Database-tier blueprint 902 includes a virtual-machine blueprint 930, for which a range of instances of 1-4 database servers is specified. Database-tier blueprint 902 also includes an SQL database software component 932, the number of instances of which is property bound to the number of database servers. This example assumes an Oracle database is specified for blueprint 300 (FIG. 3).

App-tier blueprint 904 includes a virtual-machine blueprint 940, for which a range of 1-20 instances is specified, wider than the 1-8 range specified for blueprint 300 (FIG. 3). App-tier blueprint 904 includes an app software component 942, which specifies a number of instances equal to the number of instances for virtual machine 940. App-tier blueprint 904 includes a 3-way load balancer component 944, for which the number of instances is the characteristic of N+2 divided by 3, i.e., [(N+2)/3], where N is the number of app servers. This formula differs from that used in source lifecycle blueprint, which uses 2-way load balancers instead of 3-way load balancers. An exception is made for when N=1, in which case no load balancers are used.

Web-tier blueprint 406 includes a virtual-machine blueprint 950, for which 1-4 instances are specified. Web-tier blueprint 406 also includes a web-server software component 952, which specifies that the number of instances is property bound to equal the number of instances of virtual-machines specified for virtual-machine blueprint 940.

Summarizing the differences over source lifecycle blueprint 300 (FIG. 3), source lifecycle blueprint 900: 1) specifies at 932 that the database be SQL; 2) expands the range of app-tier virtual machine instances from 1-8 to 1-20, and does the same for the app-server software; and 3) replaces 2-way load balancers with 3-way load balancers and changes the formula for the number of load-balancer instances accordingly.

In response to a request to deploy source lifecycle blueprint 900 to e-commerce application 200 as shown in FIG. 7, a reference lifecycle blueprint 1000 is created, e.g., by replicating source lifecycle blueprint 900 or an intermediate blueprint derived from source lifecycle blueprint 900 (e.g., as per management policies). Reference lifecycle blueprint 1000 (FIG. 10) is similar to source lifecycle blueprint 900 except values specified in the request are represented.

Reference lifecycle blueprint 1000 includes a database-tier blueprint 1002, an app-tier blueprint 1004, a web-tier blueprint 1006, and storage and networking components 1008.

Database-tier blueprint 1002 includes a virtual-machine blueprint 1030, which specifies a range of 1-4 virtual machines, and specifies that one virtual machine has been selected. Database-tier blueprint 1002 also includes a SQL database software component 1032, which is property bound to virtual machine blueprint 1030 so that the number of SQL software data instances is to equal the number of virtual machines selected to be based on virtual-machine blueprint 1030.

App-tier blueprint 1006 includes virtual-machine blueprint 1050, which specifies a range of 1-20 instances, with "10" being selected. App software component 1042 is specified to have a number of instances equal to the number of virtual-machine 1040 instances specified, that is, in this case, 10. App-tier blueprint 1004 also includes a 3-way load balancer component which is property bound to the number of instances specified for virtual-machine blueprint 1040. The formula is the [(N+2)/3], i.e., the characteristic of the quotient of the number of virtual-machine instances divided by three, in this case four.

Web-tier blueprint 1006 includes a virtual-machine blueprint 1050, for which a range of 1-4 instances is specified, with "1" being selected. In addition, web-tier specifies a web-server software component 1052, with the number of instances to be equal to the number selected for virtual-machine blueprint 1050.

Figure 11:
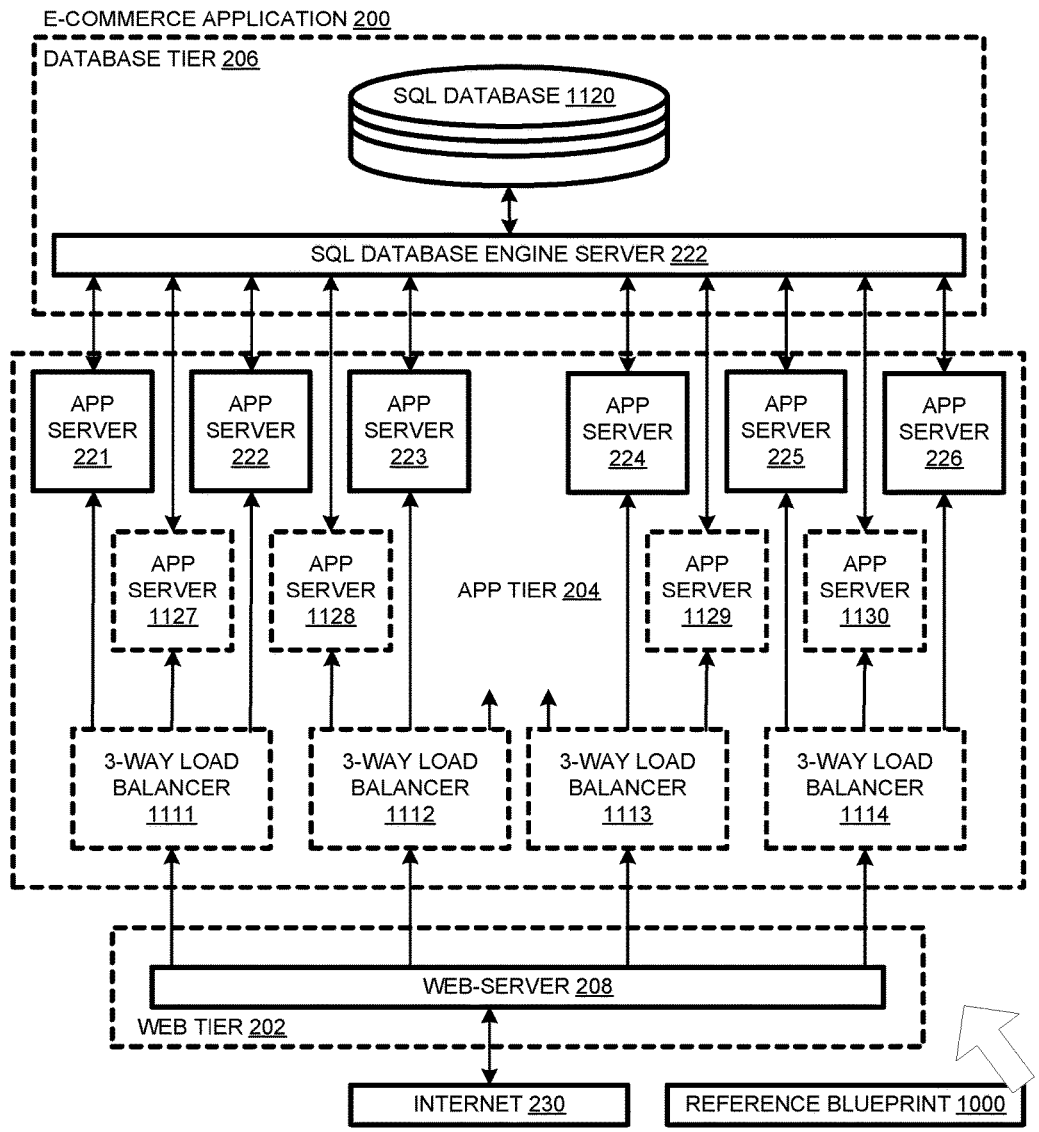
FIG. 11 is the IT application of FIG. 7 after an out-of-deployment scope modification using the lifecycle blueprints of FIGS. 9 and 10.
Figure 11:
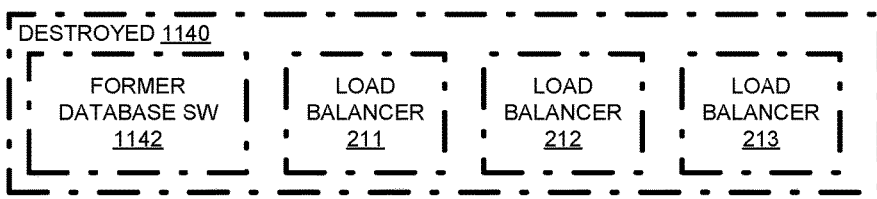

Reference lifecycle blueprint 1000 is executed in the course of the execution/deployment of source lifecycle blueprint 900. The end result is shown in FIG. 11. Four new app servers 1127, 1128, 1129, and 1130 have been added bringing the number of app servers to the desired 10. As indicated at 1140, 2-way load balancers 211, 212, and 213 have been destroyed. The destroyed load balancers have been replaced by four 3-way load balancers 1111, 1112, 1113, and 1114. Load balancer 1111 feeds app servers 221, 222, and 1127. Load balancer 1112 feeds app servers 223 and 1128, and has one unused output. Load balancer 1113 feeds app servers 224 and 1129, and has one unused output. Load balancer 1114 feeds app servers 225, 226, and 1130. Load balancers 1112 and 1113 automatically function as 2-way servers since they have one unused output each.

In database tier 206, database 220 (FIG. 7) has been converted to an SQL database 1120. The database engine on database server 222 has been converted to SQL by uninstalling and destroying the database engine based on reference lifecycle blueprint 400 (FIG. 4) and replacing with SQL software associated with reference lifecycle blueprint 1000.

Figure 12:
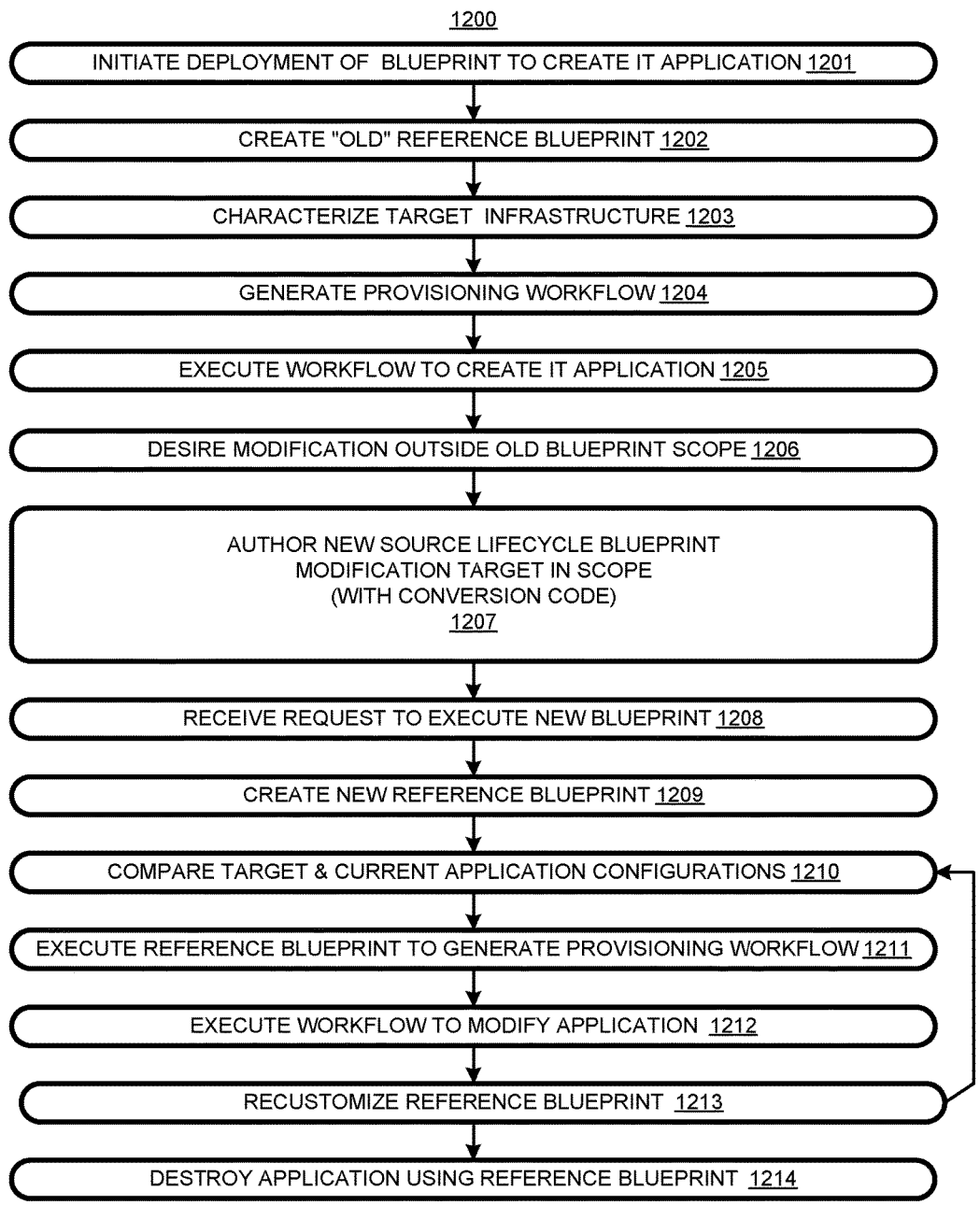
FIG. 12 is a flow chart of a process for modifying the IT application in the configuration of FIG. 7 to yield the configuration of FIG. 11 using the lifecycle blueprints of FIGS. 9 and 10.

A process 1200 for updating or otherwise modifying an IT application is flow charted in FIG. 12. At 1201, in response to a request, deployment of an "old" source lifecycle blueprint is begun. At 1202, in the course of the deployment, an "old" reference lifecycle blueprint is created, e.g., by replicating the source lifecycle blueprint or replicating another blueprint derived from the source lifecycle blueprint. At 1203, the supporting infrastructure is characterized. At 1204, the reference lifecycle blueprint is used to generate a provisioning workflow based at least in part on the current application configuration, the infrastructure, and the desired application configuration. At 1205, the workflow is executed to create the IT application.

At 1206, a modification is desired to a target configuration that is outside the scope of deployment of the old reference blueprint. That is, the goal of the modification is to provide a target configuration of the IT application that could not be produced by selecting new values from the ranges specified by the old reference lifecycle blueprint.

At 1207, a "new" source lifecycle blueprint is authored that includes the modification target configuration for the IT application within its scope of deployment. In other words, the desired configuration of 1206 could have been generated by deploying the new source lifecycle blueprint. In a variation, the new source lifecycle blueprint is created, not in response to a desired modification, but just in the course of an effort to provide a more flexible version of the old blueprint.

At 1208, in response to a request to execute the new source lifecycle blueprint, deployment is begun. At 1209, in the course of the deployment, a new reference lifecycle blueprint is created, e.g., by replicating the new source lifecycle blueprint or a replicating a blueprint derived from the source lifecycle blueprint.

At 1210, the target and current application configurations are compared. At 1211, a provisioning workflow is generated based on the comparison, and the resources of the target IT infrastructure. At 1212, the provisioning workflow is executed to yield the desired modified IT application configuration.

Further modifications can be implemented by re-customizing the new reference lifecycle blueprint and executing it at 1213 with a loop back to characterizing the application configuration and infrastructure. At 1214, the IT application is destroyed in accordance with methods in the new reference lifecycle blueprint.

Figure 13:
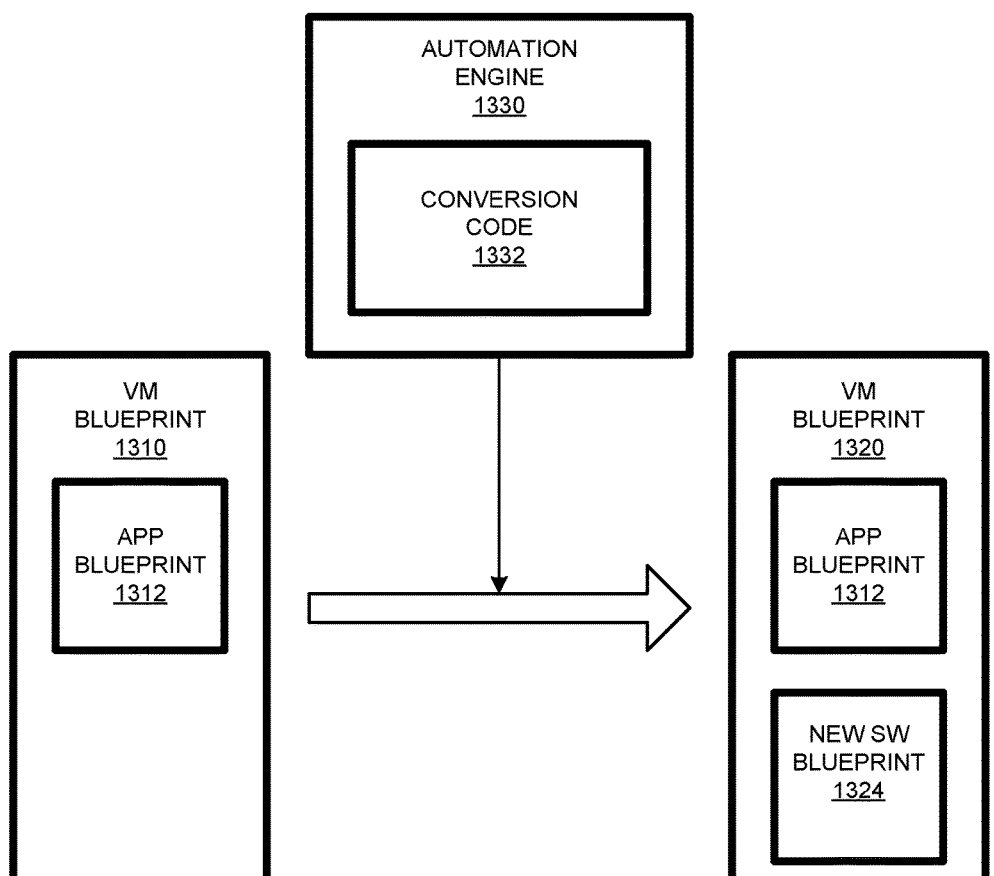
FIG. 13 depicts a conversion of an existing application from a first virtual-machine blueprint to a second virtual-machine blueprint to enable a software component to be added to the application.

In FIG. 13, a virtual machine blueprint 1310 includes an app blueprint 1312. It is desired to add software such as a log agent or a security utility to an application implemented by deploying virtual-machine blueprint 1310, but blueprint 1310 does not provide for the additional software. Accordingly, a different virtual-machine blueprint 1320 that provides for app blueprint 1312 and an additional software blueprint or basic component is assigned to the application. Automation engine 1330 detects the new virtual-machine blueprint 1320 and identifies the differences between it and the previous virtual-machine blueprint 1310. Automation engine 1330 includes conversion code 1332 for generating a workflow to deploy virtual machine blueprint 1320 over the current application.

A "lifecycle blueprint" is a blueprint that can be used to create, modify, and destroy an IT application. Herein, "derive" as applied to blueprints means obtain by copying and modifying one or more other blueprints. "Scaling" herein refers to changing the number of instances of a component in an IT application. "Scaling-out" means increasing the number; "scaling-in" means decreasing the number. The terms "parent" and "child" are defined relative to each other; a parent (application or blueprint) component includes a respective child component, or a child component somehow depends on a respective parent component.

A lifecycle blueprint can be "dedicated" to an IT application if it is used to manage/modify the IT application. Thus, in FIGS. 2 and 7, reference lifecycle blueprint 400 is dedicated to IT application 200. In FIG. 11, reference lifecycle blueprint 1000 is dedicated to IT application 200, and the dedication of blueprint 400 has been terminated. Typically, reference lifecycle blueprints are dedicated, and source lifecycle blueprints are not dedicated to a specific IT application. Typically, at most one lifecycle blueprint is dedicated to an IT application at any given time.

The lifecycle blueprints herein include "idempotent" methods, that is, methods that reach the same result despite different initial conditions. Idempotency allows methods used to create an IT application to also be used to modify the IT application. Idempotency may involve comparing a requested configuration of a target infrastructure with its current configuration and then generating a workflow designed to modify the current configuration to attain the requested configuration. The configuration of the target infrastructure is typically the configuration of the IT application, if any, executing on the target infrastructure.

Herein, art labeled "prior art", if any, is admitted prior art; art not labelled prior art, if any, is not admitted prior art. The illustrated and other embodiments, as well as variations upon and modifications thereto, are provided for by the present invention, the scope of which is defined by the following claims.

What is claimed is:

1. A process comprising:
    issuing a request for execution of a new lifecycle blueprint to an infrastructure hosting an information-technology (IT) application that was created by deploying an old lifecycle blueprint to the infrastructure, the request specifying a target configuration of the IT application that is within a scope of deployment of the new lifecycle blueprint and outside the scope of deployment of the old lifecycle blueprint;
    in the course of the execution of the new lifecycle blueprint, comparing the target and current configurations of the IT application;
    in the course of the execution of the new lifecycle blueprint, generating a workflow for converting the IT application from its current configuration to the target configuration; and
    in the course of the execution of the new lifecycle blueprint, executing the workflow to yield the target configuration of the IT application.

2. The process of claim 1 further comprising destroying the IT application by destroying components in an order specified by the new lifecycle blueprint or of a blueprint derived from the new lifecycle blueprint.

3. The process of claim 1 further comprising modifying an old configuration of the IT application to yield the current configuration by executing the old lifecycle blueprint.

4. The process of claim 1 further comprising executing the new lifecycle blueprint to modify the IT application from the target configuration to another configuration.

5. A system comprising non-transitory media encoded with code that, when executing using hardware, implements a process including:
    issuing a request for execution of a new lifecycle blueprint to an infrastructure hosting an information-technology (IT) application that was created by deploying an old lifecycle blueprint to the infrastructure, the request specifying a target configuration of the IT application that is within a scope of deployment of the new lifecycle blueprint and outside the scope of deployment of the old lifecycle blueprint;

in the course of the execution of the new lifecycle blueprint, determining the current configuration of the IT application;

in the course of the execution of the new lifecycle blueprint, generating a workflow for converting the IT application from its current configuration to the target configuration; and in the course of the execution of the new lifecycle blueprint, executing the workflow to yield the target configuration of the IT application.

6. The system of claim 5 wherein the current configuration of the IT application is outside the scope of deployment of the new lifecycle blueprint.

7. The system of claim 6 wherein conversion code, when executed, preserves some state data of the current configuration for use in the target configuration.

8. The system of claim 7 further comprising destroying the IT application by destroying components in an order specified by the new lifecycle blueprint or of a blueprint derived from the new lifecycle blueprint.

9. The system of claim 6 further comprising executing the new lifecycle blueprint to modify the IT application from the target configuration to another configuration.

10. The system of claim 5 further comprising modifying an old configuration of the IT application to yield the current configuration by executing the old lifecycle blueprint.

11. The system of claim 5 further comprising the hardware.

* * * * *